United States Patent [19]
Engelke

[11] 3,763,425
[45] Oct. 2, 1973

[54] METHOD OF TESTING THE CONTINUITY OF AN ELECTRICAL CONDUCTOR BY USE OF AN ELECTRON BEAM CONVERTED FROM HIGH TO LOW ENERGY

[75] Inventor: Helmut Engelke, Wengertsteige, Germany

[73] Assignee: International Business Machines Corporation, Armonk, N.Y.

[22] Filed: July 27, 1972

[21] Appl. No.: 275,608

[30] Foreign Application Priority Data
Feb. 18, 1972  Germany.................. P 22 07 546.3

[52] U.S. Cl.......... 324/51, 250/49.5 PE, 324/158 R
[51] Int. Cl............................................. G01r 31/02
[58] Field of Search ................ 324/51, 54, 73, 158; 250/49.5 PE

[56] References Cited
UNITED STATES PATENTS

| | | | |
|---|---|---|---|
| 3,196,246 | 7/1965 | El-Karch................ | 250/49.5 PE X |
| 3,448,377 | 6/1969 | Seiwatz et al.......................... | 324/54 |
| 3,531,716 | 9/1970 | Tarui et al............................ | 324/51 |
| 3,703,637 | 11/1972 | Dugan........................... | 250/49.5 PE |
| 3,549,999 | 12/1970 | Norton............................. | 324/51 X |

FOREIGN PATENTS OR APPLICATIONS
1,188,417  4/1970  Great Britain............... 250/49.5 PE

*Primary Examiner*—Gerard R. Strecker
*Attorney*—John F. Osterndorf et al.

[57]     ABSTRACT

A non-contact method of testing for the electrical continuity of a conductor line. The line is embedded in a medium with its ends exposed. A target mask having holes aligned with the conductor line ends is proximately positioned with respect to the medium. Primary electrons having a high acceleration are directed at the mask and are converted into low energy secondary electron emission for striking the conductor line ends emitting additional secondary electrons which are monitored at collectors forming a part of the mask to obtain an indication of the continuity state of the conductor line.

7 Claims, 2 Drawing Figures

METHOD OF TESTING THE CONTINUITY OF AN ELECTRICAL CONDUCTOR BY USE OF AN ELECTRON BEAM CONVERTED FROM HIGH TO LOW ENERGY

BACKGROUND OF THE INVENTION

1. Field of the Invention

The invention relates to non-contact testing and, more particularly, to a method for testing the electrical continuity of a conductor line using secondary electron radiation derived from a primary electron beam.

2. Description of the Prior Art

With the increasing miniaturization of electronic components, there has been a corresponding increase in the need for non-contact methods for checking the conductor wiring interconnecting these components for continuity. One method, which has been described and claimed in application Ser. No. 252,774 filed May 12, 1972 in the names of Harald Bohlen, et al., and which is assigned to the assignee of this invention, involves the use of electron beams. Low inertia is involved in positioning them as they exert an electric effect on the components to be checked. However, high acceleration voltages for the electron beams are required to assure fine focusing of the electron beams.

In the method described in the aforecited application, at least one end of the conductor line is bombarded with an electron beam and brought to a predetermined potential. This occurs by controlled secondary electron emission so that, between the two ends of the conductor line, there is a difference of potential effecting a definable current flow through the conductive line. With the method described in that application, successful operation is achieved only with relatively low acceleration voltages for the electron beams. The utilization of the controlled secondary electron emission requires primary energies for the electrons of less than 1 keV. On the other hand, considerable beam currents of about 100 $\mu$A are required for a sufficient sensitivity for the method. A beam of that type can be sufficiently focused only when the distance between the last focusing lens and the point of beam impingement is sufficiently small. The larger the distance, the greater the broadening of the beam owing to the mutual repelling of the electrons during their flight. With a fixed distance, the broadening increases with a decreasing energy of the electrons.

For testing continuous connections, the diameter of the impinging electron beam has to be smaller than that of the end of the conductor line, i.e., smaller than 0.1 mm with the electronic components used at present. With the given electron energies of less than 1 keV, this requires a distance which is smaller than 1 cm. The deflection field that can be covered by the beam is therefore of a size of less than 1 $cm^2$, with moderate deflection angles, and thus covers only a small fraction of the surface of the wiring components which can amount to 100 $cm^2$ maximum. For testing such components, it is therefore necessary to arrange a large number of radiation systems one beside the other or, by a less complex method, to design the radiation systems in such a manner that they are shiftable with respect to the object to be tested. However, the latter method involves a considerable increase in testing time.

SUMMARY OF THE INVENTION

It is therefore an object of the invention to provide a method of non-contact testing of an electrically continuous connection in a conductor line by means of electron beams which, in spite of the fact that the energy of the impinging electrons has to be low, operates with only one radiation system which is not shiftable with respect to the object to be tested, the radiation system having a deflection field of sufficient size. According to an aspect of the invention, highly accelerated electron beams are used which, prior to their impinging on the conductor line, are converted into beams with a relatively low energy, by means of a device arranged closely over the ends of the conductor line. For that purpose, an electron beam converter is preferably used in which the highly accelerated electrons generate secondary electrons with low energy.

The electron beam converter is formed of two parallel electrically conductive layers separated by an isolation layer. The converter is provided with throughgoing holes leading toward the ends of the conductor line. The holes are inclined in such a manner through the top conductive layer that the highly accelerated primary electron beam impinges vertically on this layer and does not reach the ends of the conductor line. It is suitably directed to the internal faces of the inclined holes for generating the secondary electrons.

For accelerating the secondary electrons towards the ends of the conductor lines, the lower conductive layer of the electron beam converter is positively biased with respect to the top conductive layer. Preferably, the controlled secondary electron emission of at least one of the ends of the conductor line is effected through the lower electrically conductive layer of the electron beam converter. This layer is divided into a number of isolated parts corresponding to the number of conductor ends, and voltages are applied to the various parts associated with the ends of the conductor line.

DESCRIPTION OF THE PREFERRED EMBODIMENT

Figure 1:
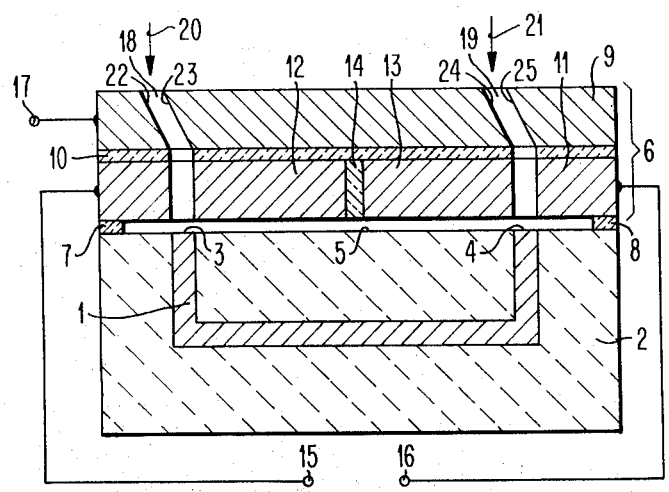
FIG. 1 is a diagram in section of apparatus for carrying out the principles of the method of the invention.

Referring now to FIG. 1, conductor 1 is embedded in a carrier 2 made of isolation material. The two ends 3, 4 of the conductor appear on the upper side 5 of carrier 2 at the latter's surface. To test the electrical continuity of conductor 1, a target mask 6 is arranged in parallel to the upper surface 5 of carrier 2 and at a small distance therefrom. The distance between carrier 2 and target mask 6 is ensured by spacing units 7, 8 made of isolation material.

Target mask 6 itself consists of three superimposed layers. An upper metal layer 9 is separated by an isolation layer 10 from a lower metal layer 11. Metal layer 11, in turn, is divided into two segments 12 and 13. The segments are isolated at 14 against each other to enable them to operate as collectors. Each collector is equipped with an electric connection so that it can be brought to a predetermined potential via terminals 15 or 16, respectively. The function of collectors 12, 13 is to catch the secondary electrons leaving the respective adjacent conductor end. Upper metal layer 9 is brought, via a terminal 17, to a negative bias of 400 Volts approximately with respect to collectors 12 and 13.

Above ends 3, 4 of conductor 1, target mask 6 is provided with holes 18, 19. The holes pass through the three layers of the target mask, but in the upper metal layer 9 they are required to pass through in an inclined direction, i.e., not vertically to the upper surface of this layer. Focused primary electron beams (not shown) of high energy are directed according to arrows 20, 21 into holes 18, 19, respectively, for testing conductor 1. In view of the inclined nature of the entering portions of holes 18, 19, the electron beams do not impinge on the ends of conductor 1 but rather on walls 22, 23 and 24, 25 in the upper metal layer 9.

The striking of the primary electrons on walls 22-25 in the respective inclined part of holes 18 and 19 causes secondary electrons to be emitted from metal layer 9. Due to the potential gradient existing between layers 9 and 11, these secondary electrons are accelerated towards ends 3, 4 of conductor 1. When the conductor ends are struck by these secondary electrons, additional secondary electrons are emitted by the conductor ends to be received by collectors 12 and 13. The voltage between layers 9 and 11 is selected so that the electrons impinging on the conductor ends have the optimum energy for a secondary emission, i.e., less than 1 keV. The energy of the primary electrons impinging on walls 22-25 of holes 18 and 19, on the other hand, is approximately 20 keV.

The layers of target mask 6 have the following dimensions: the thickness of layers 9 and 11 is $200\mu$ m in each case, whereas isolation layer 10 has a thickness of $50\mu$ m. The diameter of holes 13 and 14 is approximately $100\mu$m. The voltage between layers 9 and 11 is preferably 400 Volts. For purposes of depicting the apparatus for carrying the methods of the invention, the thickness of target mask 6 and the diameters of holes 18 and 19 and of conductor 1 are drawn to a larger scale than the other dimensions for clarity of representation.

The diameter of the secondary beams generated in target mask 6 corresponds to the hole diameters in the lower metal layer 11. Beam current $I_s$ of the secondary electrons equals primary current $I_p$ multiplied by secondary electron yield $\delta$ and the transfer yield $g$ between layers 9 and 11.

$$I_s = \delta \cdot g \cdot I_p$$

$\delta$ is equal to the average number of secondary electrons which are emitted from a target surface when a primary electron hits the target. It depends on the target material and the energy as well as the angle of incidence of the primary electrons. The transfer yield g corresponds to the ratio of the number of secondary electrons appearing at the lower side of target mask 6 (from layer 11) to the number of secondary electrons generated in the target mask. The product of $g \cdot \delta$ in the described mask arrangement is, for a primary beam with an acceleration voltage of about 20 keV, in the order of 0.2 – 0.4. This corresponds to an attenuation of the free electron current in the mask by a factor 2.5 – 5.

As described in the aforecited application, the testing method is performed in such a manner that the potential of a conductor end is brought to a value, by means of controlled secondary electron emission, which depends on the potential of the opposite collector. By applying a low voltage between collectors 12 and 13, the two ends of conductor 1 are brought to different potentials too, so that a current flows through conductor 1. This current can be determined as described more fully in the aforecited application, by measuring the current flowing through the supply line for one of the collectors to obtain an indication of the continuity condition of the conductor line. An alternating voltage may also be applied between the collectors so that the current flowing through conductor 1 is related to the alternating current flowing in the supply line for one of the collectors.

Figure 2:
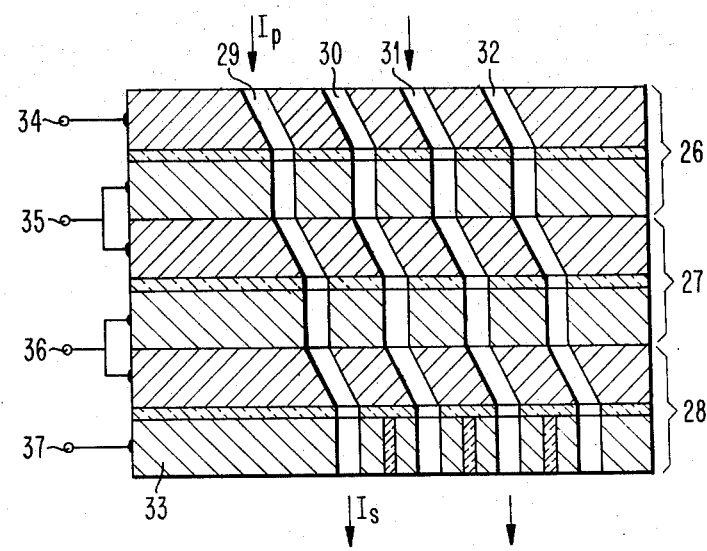
FIG. 2 is a diagram in section of a multistage electron beam converter that may be employed in the method of the invention.

If, as shown in FIG. 2, several electron beam converters 26, 27 and 28 are arranged in series in a composite mask, it is possible to amplify the beam by means of secondary electron multiplication. Owing to the high primary energy with only one electron beam converter, as shown in FIG. 1, a beam amplification is not possible. For the respective upper layer of the individual converters a material with high secondary electron yield, such as copper beryllium, is used. The acceleration voltage between the two conductive layers of a converter is set in such a manner that the product of $g \cdot \delta$ takes a maximum value.

With n series-arranged electron beam converters current amplification V is given by the following formula:

$$V = I_s/I_p = g \cdot \delta_1 (g \cdot \delta)^{n-1}$$

$\delta_1$ being the secondary electron yield at the first converter, and $\delta$ the yield at the following converters.

The target mask of FIG. 2 has four holes 29-32 through which four conductor ends can be exposed to radiation. A difference of potential between the respective layers of each stage of the converter is applied by way of the terminals 34-37. Generally, the number of holes in a mask corresponds to the number of conductor ends appearing at the upper surface of the carrier. The lower metal layer 33 of the lowest converter 28 is then divided into a number of segments to which the necessary potentials can be applied enabling the segments to act as the collectors of the secondary electrons emitted from the conductor ends.

The non-contact method of testing for the continuity of electrical connection in a conductor line provides for a beam of primary electrons of high acceleration voltage to be converted by a target mask into a slow beam with a selected electron energy and a focusing of high quality. The target mask used for the conversion has a portion employed for detection. The mask can be formed so that beam current amplification is possible. The method of the invention accomplishes a strong extension of the deflection field achieved by a slow electron beam. Such an extension cannot be achieved with the same beam parameters using strict electron-optical methods.

While the invention has been particularly shown and described with reference to the preferred embodiments thereof, it will be understood by those skilled in the art that the foregoing and other changes in form and detail may be made therein without departing from the spirit and scope of the invention.

What is claimed is:

1. A non-contact method of testing the electrical continuity of a conductor line comprising the steps of directing a beam of high energy primary electrons toward at least one end of the conductor line,
interposing an energy converter between the beam of primary electrons and the line for converting the primary electrons to secondary electron emission thereby converting said beam into a beam of electrons of low energy prior to impact at said one end, controlling the potential at said one end due to the impact of said low energy beam on it, so that current flows through the conductor line, and measuring the current flow through the line at the other end to determine the electrical continuity of the line.

2. The method of claim 1, wherein the converter has at least two conductive portions electrically isolated from one another and a difference of potential is applied between the portions with the portion closer to the line being more positive than the other, whereby the secondary electron emission is accelerated for impact at said one end.

3. The method of claim 2, wherein the potential at said one end is controlled by secondary emission resulting from the impact of said low energy beam and the secondary emission is controlled by the more positive conductive portion of th converter.

4. The method of claim 3, wherein the more positive conductive portion is divided into a number of parts electrically isolated from one another, the number corresponding to the number of conductor line ends, and the method comprises the step of applying a voltage between the parts of said conductive portion operatively associated with the respective ends of a conductor line.

5. The method of claim 4, wherein said low energy beam is highly accelerated by forming said energy converter into multiple stages each with two conductive portions having a difference of potential between them and with the portion most proximate to the conductor line being divided into said number of parts.

6. Apparatus for measuring the electrical continuity of an embedded conductor line having its ends exposed, comprising means for directing a beam of high energy primary electrons toward at least one end of said line, a target mask having apertures therethrough corresponding in number to the number of conductor ends, and including energy converting means for changing said high energy beam to a secondary electron emission low energy beam for impact at said one end to cause secondary emission therefrom, said mask comprising means for raising the potential at said one conductor line end by controlling the secondary emission from said end, so that current flows through the line, and means for measuring the current flow through the line at the other end, whereby an indication of the electrical continuity of the line is obtained.

7. The apparatus of claim 6, wherein said target mask is formed of a plurality of stages, each stage including two conductive and electrically isolated portions with a difference of potential between them for successively accelerating the low energy beam for impact at said one end.

* * * * *